Nov. 26, 1929.                A. REIMER                    1,737,201
                    BREEDING MARK FOR SMALL ANIMALS
                         Filed July 18, 1928

Patented Nov. 26, 1929

1,737,201

UNITED STATES PATENT OFFICE

ANNEMARIE REIMER, OF ALBRECHTSCHEIDE, NEAR GR. ENGELAU, GERMANY

BREEDING MARK FOR SMALL ANIMALS

Application filed July 18, 1928, Serial No. 293,595, and in Germany July 20, 1927.

It is sometimes rather difficult to fix on the member of the body the breeding marks commonly used by breeders for small animals, or these marks are liable to get lost. This invention has for its object to improve the construction of such breeding marks so that they can be easily fastened, even by unskilled persons, on a certain member of the body of the animal and so that they cannot get lost. With this object in view the breeding mark consists of a U-shaped bow one arm of which is pointed, the other arm carrying a piece of thin sheet metal one edge of which is folded round the arm of the bow. The pointed arm of the bow is stuck through the skin of the animal and the piece of thin sheet metal is then turned around the other arm of the bow and fastened on the pointed arm by being folded over the same with the aid of tongs. The closed and attached breeding mark fits tightly on the member of the body of the animal and cannot be caught by protruding sticks or the like. The signs and marks are stamped into the sheet metal plate.

An embodiment of the invention is illustrated, by way of example, on the accompanying drawing in which Fig. 1 is a front elevation showing the closed breeding mark.

Figure 1:
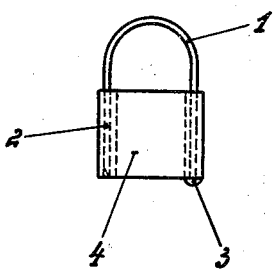
Figure 2:
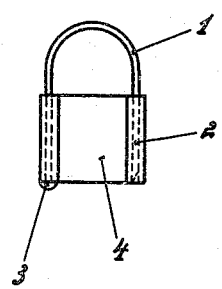
Fig. 2 is a rear elevation of the closed breeding mark.
Figure 3:
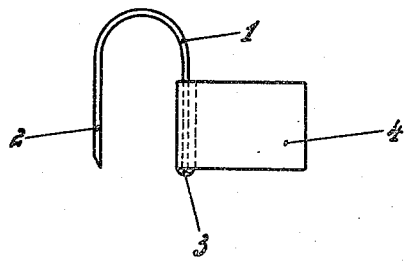
Fig. 3 shows in front elevation a breeding mark open.

The arm 2 of the U-shaped wire bow 1 is pointed, the arm 3 of the bow being blunt or having a head at its lower end. A plate 4 of sheet metal is mounted on the arm 3 of the bow by means of its edge folded around this arm.

The pointed arm 2 of the bow 1 is stuck through the skin of the animal at any desired point and pushed in until the skin is on the web of the bow. The plate 3 is then turned around the arm 3 and its free edge is fixed on the arm 2 of the bow by being folded around this arm with the aid of tongs. The mark is then securely held on the member of the animal and cannot get caught on any object as it is lying close against the skin.

The signs and marks are stamped into the sheet metal plate 4.

What I claim, is:

A breeding mark for small animals, comprising in combination a U-shaped bow having one pointed arm and an arm with a head at the lower end, and a plate of sheet metal on which the signs or marks are to be stamped folded at one edge over said arm of the bow which has a head so that after the pointed arm of the bow has been stuck through the skin of the animal said plate may be turned and attached on the pointed arm by having its free edge folded around this pointed arm.

In testimony whereof I have hereunto set my hand.

Frau ANNEMARIE REIMER, née LIMPERT.